3,299,138
QUATERNIZED DIMER TETRAMINE

Arthur B. Sveum, Minneapolis, and John F. Zalar, St. Paul, Minn., assignors to General Mills, Inc., a corporation of Delaware
No Drawing. Filed Mar. 19, 1964, Ser. No. 353,282
2 Claims. (Cl. 260—567.6)

The present invention relates to certain quarternary ammonium derivatives of polymeric fat acids. The compounds of the present invention have the following formula:

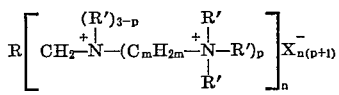

where R is the hydrocarbon radical of the polymeric fat acid $R(COOH)_n$ obtained by the polymerization of an unsaturated higher fatty acid. R' is a lower aliphatic hydrocarbon radical containing from 1 to 4 carbon atoms, $m$ is 3 or 4, $n$ is 2 or 3, and $p$ is 1 or 2, and $x$ is a quaternary ammonium anion. In the formula, $x$ has been indicated as a monovalent anion. It will be appreciated that $x$ can be polyvalent in which event the number of anions would be reduced proportionately to the valence of the anion. These compounds are useful as clay flocculants and hydrophobic agents, as antistatic agents for hydrophobic surfaces and fibers, as corrosion inhibitors per se and as corrosion inhibitors in protective coatings; as antimicrobials; as precipitants for anionic surfactants, antibiotics, etc.; and as pigment wetting agents.

It is therefore an object of the present invention to provide novel compounds having the above formula.

These compounds are derived from polymeric fat acids which are articles of commerce. Polymeric fat acids are generally prepared by the thermal or catalytic polymerization of unsaturated higher fatty acids having sufficient double bond functionality to form the polymeric material. In general, they may be derived from any unsaturated higher fatty acid containing from 8 to 22 carbon atoms and generally are derived from fatty acids of such oils as soybean, linseed, tung, perilla, cotton seed, corn, sunflower, safflower and dehydrated castor oil as well as from tall oil fatty acids. They are generally derived commercially from linoleic acid and the present invention will be particularly descriptive with reference to polymeric fat acids derived from linoleic acid. The polymerization reaction mixture of fatty acids generally contains the dimer acid predominantly with minor amounts of trimer and other polymers and small amounts of monomer.

The polymeric fat acids are first reacted with ammonia to convert them to the nitrile which is then hydrogenated to form the dimer amine. The dimer amine is then reacted with an unsaturated nitrile, such as acrylonitrile, to form a cyanoethyl adduct on the amine groups. Each of the hydrogens on the amine groups of the dimer amine is replaceable by a cyanoethyl group and, accordingly, it is possible to replace any number of the amino hydrogens in this manner. The cyano group can then be reduced to an amino group and the product subsequently quaternized.

The preparation of the aminopropyl dimer amines is disclosed in U.S. Patent 3,010,782. In addition to the use of acrylonitrile for the formation of the adducts, it is possible to use other unsaturated nitriles, such as crotononitrile and methacrylonitrile.

The quaternization of the aminopropyl dimer amine may be accomplished by reaction with a variety of alkylating agents including methylchloride, methylbromide, methyliodide, ethylchloride, ethylbromide, ethyliodide, n-propyl-chloride, n-propyl-bromide, n-propyl-iodide, isopropyl bromide, n-butyl chloride, n-butyl bromide, isobutyl bromide, secondary butyl bromide, dimethyl sulfate, diethyl sulfate to give the corresponding chlorides, bromides, iodides, methosulphates, ethosulfates, and the like. In addition, other anions, such as nitrate, nitrite, phosphate, sulfate, and the like, may be used.

The reaction with the alkylating agent is preferably conducted in the presence of an alkaline material such as sodium hydroxide or bicarbonate in an isopropanol solution.

The following examples will serve to illustrate the invention.

Example 1

125 pounds of aminopropyl amine derivative of polymeric fat acids prepared as described in Patent 3,010,782 and which was derived from linoleic acid, 133 pounds of isopropanol and 22½ pounds of sodium bicarbonate were charged to a 70 gallon pilot plant pressure reactor which was then sealed. The temperature of the reactor was adjusted to 50 to 60 degrees C. 1 equivalent, 49 pounds of 73% sodium hydroxide solution, was then introduced into the system at a constant rate period of 90 to 122 minutes. Methylchloride was then added to the reactor in a controlled manner so that the reactor pressure of 75 pounds per scale inch gauge was maintained and the temperature was controlled between 85 and 90 degrees C. The batch was sampled 30 minutes after the completion of the sodium hydroxide addition. The sample was filtered to remove solid sodium bicarbonate before analysis. Additional caustic or methyl chloride was then added as needed as determined by the analysis and the reaction continued until the percent amine was reduced to 1.2 and the amine hydrochloride was reduced to 0.3. The over-all reaction required 9 hours. The reaction mixture was then cooled to 55 to 60 degrees C. and the excess methyl chloride was vented from the system. The solution was filtered to yield 254 pounds of a solution having the following analysis:

Amine number _____ 1.3
Acid number _____ 0
Percent quaternary compound _____ 50.1
Percent solid _____ 51.3
Percent NaCl _____ 0.18
Percent water _____ 10.3
pH (direct) _____ 8.7
Color (Gardner) _____off__ 16
Iodine value _____ 38.4

The quaternary compound was predominantly:

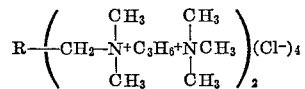

It also contained small amounts of the comparable derivative of the trimer fatty amine and of the monomer fatty amine.

The quaternary product was found to be an effective bactericide against such organisms as *E. coli* and *M. pyogenes*. It is also an effective algistat against *Chlorella vulgaris*, *Stigoclonium spec.*, *Anabaena cylindrica* and *Oscillatria tenuis*.

The embodiments of the present invention in which an exclusive property or privilege is claimed are defined as follows:

1. Compounds having the following formula:

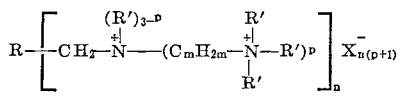

in which R is the hydrocarbon radical of the polymeric fat acids, $R(COOH)_n$ obtained by polymerization of an unsaturated higher fatty acid, R' is an aliphatic hydrocarbon group having from 1 to 4 carbon atoms and X is a quaternary ammonium anion, $m$ is an integer selected from the group consisting of 3 and 4, $n$ is an integer selected from the group consisting of 2 or 3, $p$ is an integer selected from the group consisting of 1 and 2.

2. Compounds having the following formula:

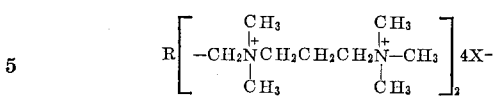

in which R is the hydrocarbon radical of the polymeric fat acids, $R(COOH)_2$ obtained by the polymerization of an unsaturated higher fatty acid and X is a quaternary ammonium anion.

No references cited.

CHARLES B. PARKER, *Primary Examiner.*

R. V. HINES, *Assistant Examiner.*